United States Patent Office 3,348,916
Patented Oct. 24, 1967

3,348,916
HYDROGEN PEROXIDE
William Reid Logan, Dunstable, and John Edwin Braid, Luton, England, assignors to Laporte Chemicals Limited, Luton, England, a British company
No Drawing. Filed Sept. 15, 1964, Ser. No. 396,747
Claims priority, application Great Britain, Sept. 18, 1963, 36,764/63
11 Claims. (Cl. 23—207)

This invention relates to certain novel alkyl substituted naphthoquinones and to the use of them and certain other alkyl substituted naphthoquinones in the production of hydrogen peroxide.

One well-known type of process for producing hydrogen peroxide involves subjecting a working solution comprising an organic solute in an organic solvent system to cycles of steps which include hydrogenation, oxidation, and extraction of the hydrogen peroxide formed with a suitable solvent, for example water.

Several organic compounds have been proposed for use as solute in the working solution in such processes. Alkyl anthraquinones, especially 2-ethyl anthraquinone and 2-t-butyl anthraquinone are most often used and, more recently, 2-amyl anthraquinone has been used.

The present invention provides a process for the production of hydrogen peroxide by subjecting a working solution comprising an organic solute in an organic solvent system to cycles of steps which include hydrogenation, oxidation, and extraction of the hydrogen peroxide formed by the oxidation; wherein the organic solute of the working solution contains at least one naphthoquinone having the general formula:

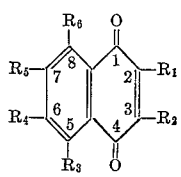

in which $R_1$ and $R_2$, which may be the same or different, represent alkyl groups having up to 9 carbon atoms, and $R_3$ to $R_6$, which may be the same or different, represent hydrogen atoms or alkyl groups having up to 9 carbon atoms. Conveniently the alkyl groups contain up to to 6 carbon atoms; those with 1 to 4 carbon atoms being especially suitable.

Normally it is preferred that the solute consist of one or more of the naphthoquinones, that is to say, the naphthoquinones will not normally be employed in association with other known organic compounds, for example, alkyl anthraquinones.

If a 2,3-alkyl disubstituted naphthoquinone is to be employed (i.e. $R_1=R_2=$alkyl up to $C_9$; $R_3$ to $R_6=$H), the 2,3 diethyl; 2-methyl 3-ethyl; 2-methyl 3-n-butyl, and (especially) 2-methyl 3-n-propyl compounds are suitable. One suitable trisubstituted compound is 2,6-dimethyl-3-ethyl naphthoquinone ($R_1=R_4=$methyl; $R_2=$ethyl; $R_3=R_6=$H).

One method of preparation of 2-methyl-3-ethylnaphthoquinone is described in J.C.S. 1953, 1196; the starting material being 2-methyl naphthoquinone, which can be obtained by oxidising 2-methyl naphthalene. By starting with 2-ethylnaphthalene and following the same procedure 2,3-diethyl naphthoquinone is obtained. By starting with 2,6-dimethyl naphthalene then 2,6-dimethyl, 3-ethyl-naphthoquinone can be obtained.

The preparation of the 2-methyl-3-n-propyl and 2-methyl-3-n-butyl naphthoquinones is conveniently effected by starting with 2-methyl naphthalene. This is first oxidised to the corresponding naphthaquinone in known manner and is then alkylated by the tetravalent-lead ester alkylation method described in J.A.C.S. 1942, 64, 2043.

Suitable solvents for the working solution for use in processes according to the invention include, for example, (a) mixtures of benzene or polyalkyl benzenes with esters of cyclohexanol and/or alkylcyclohexanols, e.g. 50/50 v./v. of benzene and methyl cyclohexanol acetate (sextate), and (b) hydrocarbon/ketone mixtures, the ketone being, for example, di-isobutyl ketone.

Several advantages accrue from a process in accordance with the invention. For instance, the stability of substituted naphthoquinones having the above formula towards over-reduction is most marked. It has been found that the rate of hydrogen uptake of the fully reduced form of the diethyl compound is only $\frac{1}{567}$ of the rate of hydrogen uptake during the conversion of quinone to quinol. Again, the stability of the quinone form towards oxidative degradation is good.

In addition to this good stability the dissubstituted and higher substituted naphthoquinones having the above general formula possess improved solubility in the working solution and, consequently, greater capacity for producing hydrogen peroxide.

Naphthoquinones which contain no, or only one, alkyl substituent in the quinonoid ring are not suitable for use as hydrogen carriers since they produce quinols which do not undergo sufficiently rapid autoxidation. Also, they are more susceptible to oxidative degradation by hydrogen peroxide and oxygen than the 2,3-disubstituted quinones. The same disadvantages are possessed by disubstituted naphthoquinones having one substituent in each ring.

The following examples further illustrate the invention. Examples 1 to 3 show autoxidation rates. Example 4 compares solubilities. Examples 5 and 6 illustrate resistance of the quinones to oxidative degradation.

*Example 1*

2,3-diethyl-naphthoquinone dissolved in a 50/50 v./v. mixture of benzene and sextate to the extent of 10 g./litre of solvent was reduced to the quinol in 6 minutes at 25° C. with hydrogen at atmospheric pressure in the presence of a catalyst comprising 2% palladium on an inert support. The fully reduced solution, after removal of catalyst, was oxidised with oxygen in 9.5 minutes under the same conditions of temperature and pressure. The hydrogen peroxide produced was extracted with water in 99.5% yield.

*Example 2*

Under the conditions detailed in Example 1, 2,3-dimethyl-naphthoquinone was reduced to the quinol in 7 minutes, and the reduced solution was oxidised in 10 minutes. The hydrogen peroxide produced was extracted with water in quantitative yield.

*Example 3*

Under the conditions detailed in Example 1, 2-methyl, 3-ethyl naphthoquinone was reduced to the quinol in 7.5 minutes, and the reduced solution was oxidised in 6 minutes. The hydrogen peroxide was extracted with water in 100% yield.

*Example 4*

The solubility advantage which can be obtained from the use of 2,3-dialkyl-naphthoquinones is illustrated by the data in the following table:

| Compound | Solubility (as equivalent $H_2O_2$) 50/50 v./v. benzene/sextate | |
|---|---|---|
| | (a) of Quinone at 25° C. (g./l. solvent) | (b) of Quinol at 25° C. (g./l. solvent) |
| 2-ethylanthraquinone | 24.2 | 3.3 |
| 2,3-dimethylnaphthoquinone | 24 | 3.3 |
| 2-methyl-3-ethylnaphthoquinone | 100 | 9.5 |
| 2,3-diethylnaphthoquinone | 122 | 18.1 |
| 2-methyl-3-n-propylnaphthoquinone | 121 | 14 |
| 2-methyl-3-n-butylnaphthoquinone | 68 | 11 |
| 2,6-dimethyl-3-ethylnaphthoquinone | 78 | 3 |

*Example 5*

2,3-dimethylnaphthoquinone dissolved in acetic acid was not degraded after treatment at 50° C. with a stream of oxygen for 72 hours. Treatment of the same quinone (0.0062 mole) with hydrogen peroxide (0.53 mole) in aqueous acetic acid solution at 20° C. produced negligible oxidative degradation of the quinone after 96 hours. At 50° C. (a very severe test) the percentage degradation after 20 hours was about 10%, after 40 hours—20%, and even after 100 hours only 30%.

*Example 6*

A solution was made of 1 g. of 2-methyl, 3-n-propyl naphthoquinone in 100 ml. of glacial acetic acid and 25 ml. of 52% w./w. $H_2O_2$. The solution was maintained at 50° C. Even after 20 hours the degradation of the naphthoquinone was still under 30%.

What we claim is:

1. A process for the production of hydrogen peroxide by subjecting a working solution comprising an organic solute in an organic solvent system to cycles of steps which include hydrogenation, oxidation, and extraction of the hydrogen peroxide formed by the oxidation; wherein the organic solute of the working solution is a member selected from the group consisting of naphthoquinones having the formula

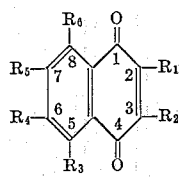

in which $R_1$ and $R_2$, which may be different, are each alkyl of up to 9 carbon atoms, and $R_3$ to $R_6$ which may be different, are each selected from the group consisting of hydrogen and alkyl of up to 9 carbon atoms.

2. A process as claimed in claim 1, in which the alkyl groups are each of up to six carbon atoms.

3. A process for the production of hydrogen peroxide by subjecting a working solution comprising an organic solute in an organic solvent system to cycles of steps which include hydrogenation, oxidation, and extraction of the hydrogen peroxide formed by the oxidation; wherein the organic solute of the working solution is a 2,3-alkyl disubstituted naphthoquinone.

4. A process as claimed in claim 3, wherein the solute is 2-methyl, 3-ethylnaphthoquinone.

5. A process as claimed in claim 3, wherein the solute is 2,3 diethylnaphthoquinone.

6. A process as claimed in claim 3, wherein the solute is 2-methyl 3-n-propylnaphthoquinone.

7. A process as claimed in claim 5, wherein the solute is 2-methyl 3-n-butylnaphthoquinone.

8. A process for the production of hydrogen peroxide by subjecting a working solution comprising an organic solute in an organic solvent system to cycles of steps which include hydrogenation, oxidation, and extraction of the hydrogen peroxide formed by the oxidation; wherein the organic solute of the working solution is a 2,3,6-alkyl trisubstituted naphthoquinone.

9. A process as claimed in claim 8, wherein the solute is 2,6 dimethyl 3-ethyl napthoquinone.

10. A working solution for use in a process for the production of hydrogen peroxide by subjecting a working solution comprising an organic solute in an organic solvent system to cycles of steps which include hydrogenation, oxidation, and extraction of the hydrogen peroxide formed by the oxidation; wherein the solute is a member selected from the group of naphthoquinones having the formula

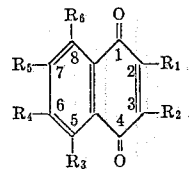

in which $R_1$ and $R_2$, which may be different, are each alkyl of up to 9 carbon atoms, and $R_3$ to $R_6$ which may be different are each selected from the group consisting of hydrogen and alkyl of up to 9 carbon atoms.

11. A working solution as claimed in claim 10, in which the naphthoquinone is 2-methyl 3-n-propyl naphthoquinone.

References Cited

UNITED STATES PATENTS

| 2,158,525 | 5/1939 | Riedl et al. | 23—207 |
| 2,348,976 | 5/1944 | Hyman | 260—396 |
| 2,398,418 | 4/1946 | Fieser | 260—396 |
| 2,860,036 | 11/1958 | Lait | 23—207 |
| 2,286,416 | 5/1959 | Cox et al. | 23—207 |

FOREIGN PATENTS 801,840   1/1951   Germany.

OSCAR R. VERTIZ, *Primary Examiner.*

H. S. MILLER, *Assistant Examiner.*